United States Patent [19]

Shaffer

[11] 4,014,638

[45] Mar. 29, 1977

[54] PHOTOFLASH LAMP WITH ELECTROSTATIC PROTECTION AND METHOD OF MAKING PHOTOFLASH UNITS

[75] Inventor: John W. Shaffer, Williamsport, Pa.

[73] Assignee: GTE Sylvania Incorporated, Montoursville, Pa.

[22] Filed: Nov. 10, 1975

[21] Appl. No.: 630,581

[52] U.S. Cl. .............................................. 431/95 R

[51] Int. Cl.[2] .............................................. A23L 1/20

[58] Field of Search .............. 431/95, 95 A, 94, 93; 102/28 S; 240/1.3

[56] References Cited

UNITED STATES PATENTS

| | | | |
|---|---|---|---|
| 2,247,384 | 7/1941 | Huyett | 102/28 S |
| 2,978,890 | 4/1961 | Chiola et al. | 431/94 |
| 3,158,014 | 11/1964 | Brouse | 431/95 |
| 3,312,085 | 4/1967 | Schilling et al. | 431/95 |

*Primary Examiner*—Carroll B. Dority, Jr.
*Assistant Examiner*—Robert J. Charvat
*Attorney, Agent, or Firm*—Edward J. Coleman

[57] ABSTRACT

A high-voltage type photoflash lamp having an ignition structure comprising a mass of primer material bridging a pair of lead-in wires which comprise the two legs of a generally hairpin-shaped wire. The bight of the hairpin-shaped wire is disposed outside the lamp envelope and provides electrostatic protection by short circuiting the lamp prior to use. Also disclosed is a method of making a photoflash unit containing such a lamp wherein the bight is cut (to enable the lamp) prior to assembling it into the unit.

4 Claims, 1 Drawing Figure

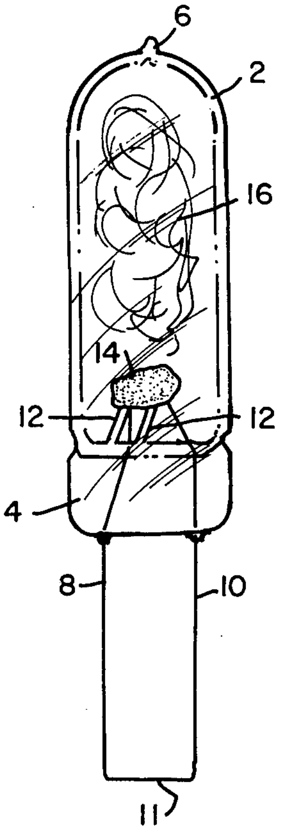
6
2
16
14
12
12
4
8
10
11

PHOTOFLASH LAMP WITH ELECTROSTATIC PROTECTION AND METHOD OF MAKING PHOTOFLASH UNITS

BACKGROUND OF THE INVENTION

This invention relates to photoflash lamps and, more particularly, to flashlamps of the type containing a primer bridge ignited by a high voltage pulse. The invention further relates to a method of making photoflash units using such lamps.

High voltage flashlamps may be divided historically into three catagories: (1) those having a spark gap within the lamp such that electrical breakdown of a gaseous dielectric (e.g., the combustion-supporting oxygen atmosphere) is an integral part of the lamp ignition mechanism; (2) those having a conductive primer bridge that electrically completes the circuit between the lead-in wires; such primers are rendered conductive by additives such as acetylene black, lead dioxide, or other electrical conductionpromoting agents; and (3) lamps having an essentially nonconducting primer bridge that connects the inner ends of the lead-in wires and which becomes conductive, upon application of a high voltage pulse, by means of breakdown of the dielectric binder separating conductive particles therein.

The earliest high voltage flashlamps were of the spark gap type construction wherein an electrical spark would pass through the gaseous atmosphere within the lamp. The spark would jump between two electrodes, at least one of which was coated with a primer composition. Such lamps tend to exhibit poor sensitivity and reliability when flashed from low power sources such as the miniaturized piezoelectric devices that are suited for incorporating into pocket-sized cameras. Most of the electrical input energy in such lamps is lost to the gas atmosphere by the spark. Also, the electrical characteristics vary considerably from one lamp to another because of shreds of metallic combustible in the spark gap and consequent variations in effective gap length.

The use of spaced lead-in wires interconnected by a quantity of electrically conductive primer gives rise to highly predictable behavior and a well-defined electrical path through the lamp. Here again, however, relatively high-powered flash sources must be used in order to attain reliable lamp flashing.

Present state of the art flashlamps of the high voltage type make use of a bridge of initially nonconducting primer to interconnect the inner ends of the lead-in wires. Considerably higher sensitivity is attainable by this method, apparently because the breakdown and discharge follow a discrete path through the primer composition and thereby promote greater localized heating. With respect to specific construction, such flashlamps typically comprise a tubular glass envelope constricted and tipped off at one end and closed at the other end by a press seal. A pair of lead-in wires pass through the glass press and terminate in an ignition structure including a glass bead, one or more sleeves or a glass reservoir of some type. A mass of primer material contained on the bead, sleeve or reservoir bridges across and contacts the ends of the lead-in wires. Also disposed within the lamp envelope is a quantity of filamentary metallic combustible, such as zirconium or hafnium, and a combustion-supporting gas, such as oxygen, at an initial fill pressure of several atmospheres. The outer surface of the lamp envelope is generally covered with a protective reinforcing coating such as cellulose acetate.

Lamp functioning is initiated by application of a high voltage pulse (e.g., several hundred to several thousand volts, as, for example, from a piezoelectric crystal) across the lamp lead-in wires. The mass of primer within the lamp then breaks down electrically and ignites; its deflagration, in turn, ignites the shredded combustible which burns actinically.

The primers used in such flashlamp are designed to be highly sensitive toward high-voltage breakdown. Electrical energies as low as a few microjoules are sufficient to promote ignition of such primers and flashing of the lamp. This high sensitivity is needed in order to provide lamps that will function reliably from the compact and inexpensive piezoelectric sources that are practical for incorporation into modern, miniature cameras. The mechanical energy delivered to the piezoelectric crystal and thereby the electrical output energy therefrom is limited both by the size of the device and by the necessity to minimize camera vibration and motion during use.

The high degree of electrical sensitivity needed in high-voltage flashlamps gives rise to distinct problems of inadvertent flashing during their manufacture, lacquer coating, and subsequent handling. Any static charges on equipment or personnel can cause these lamps to flash. Some such lamp flashes even occur when the lamps are lying stationary in an isolated spot. Apparently, even air movements can generate sufficient electrostatic energy to promote flashing of those lamps that are by nature the most sensitive and susceptible. This problem is grealy compounded by the fact that flashlamps flash sympathetically, i.e., the radiant energy from one lamp that flashes is sufficiently intense to ignite the shredded combustible in adjacent lamps. During lamp manufacture on modern high-speed equipment, it is necessary, or at least high expedient, at certain stages of processing to accumulate the lamps in containers, having from about 30 to more than 2,000 lamps in a container. The problem that is encountered is that should one lamp be inadvertently ignited, all lamps in that container will sympathetically flash and be lost.

It is common practice in photoflash lamp manufacturing to dip the lacquered lamps into a bath which leaves a film of antistatic agent on their surfaces. This does much to prevent buildup of an electrostatic charge on a lamp itself by rubbing or handling. It does not, however, give a significant protection for the lamp against contact with external charges.

SUMMARY OF THE INVENTION

In view of the foregoing, it is an object of this invention to provide an improved high-voltage type photoflash lamp with means for aiding in the prevention of inadvertent flashing due to electrostatic discharges during manufacture, processing and handling.

A further object is to provide an improved method for making a photoflash unit.

These and other objects, advantages and features are attained in accordance with the principles of this invention by providing means outside of the lamp envelope which electrically interconnects the external portions of the lamp lead-in wires to effect a short circuit thereacross. In this manner the lamp is conveniently disabled prior to use or assembly so as to provide protection against inadverent flashing due to electrostatic discharges. In making a photoflash unit including such a lamp, the external electrical connection is cut to enable the lamp just prior to assembling the lamp into the unit.

BRIEF DESCRIPTION OF THE DRAWING

This invention will be more fully described hereinafter in conjunction with the accompanying drawing, which is an elevational view of a photoflash lamp having an external lead interconnection in accordance with the invention.

DESCRIPTION OF PREFERRED EMBODIMENT

Referring to the drawing, the high-voltage type flashlamp illustrated therein comprises an hermetically sealed light-transmitting envelope 2 of glass tubing having a press 4 defining one end thereof and an exhaust tip 6 defining the other end thereof. Supported by the press 4 is an ignition means comprising a pair of lead-in wires 8 and 10 extending through and sealed into the press, an insulating sleeve 12 extending within the envelope about lead-in wires 8, and a mass of primer material 14 bridging the ends of the lead-in wires within the envelope. The insulating sleeve 12 may be formed of glass or ceramic and is preferably sealed into the envelope press 4 at one end so that only the inward end of the sleeve is open. Lead-in wire 10 passes through press 4 and is formed so that it rests and terminates at or near the open end of the sleeve 12. The mass of primer material 14, which may be dip-applied, is disposed to substantially cover the open end of the sleeve 12 and bridge the ends of the lead-in wires.

Typically, the lamp envelope 2 has an internal diameter of less than one-half inch and an internal volume of less than 1 cc. A quantity of filamentary combustible fill material 16, such as shredded zirconium or hafnium foil, is disposed within the lamp envelope. The envelope 2 is also provided with a filling of combustion-supporting gas, such as oxygen, at a pressure of several atmospheres. Typically, the exterior surface of the glass envelope 2 is also provided with a protective lacquer coating, such as cellulose acetate (not shown).

It has been found that a significant improvement in the resistance of high-voltage type flashlamps toward inadvertent ignition due to contact with external charges can be attained by manufacturing such lamps in a way that provides an electrical connection between the external ends of the lead-in wires. This may be done, for example, by fabricating the lead-in wires from a single hairpin and leaving the bight 11 to electrically interconnect lead-in wires 8 and 10. This bight, or loop, 11 effects a short circuit across the wires and apparently provides its protective function by preventing voltage differentials across the two wires, which in turn prevents firing of the primer bridge by electrical discharges through it from one lead-in wire to the other. In effect, the loop 11 disables the lamp.

If such lamps are to be flashed individually, the protective loop could remain in place until the lamp is, for example, pulled out of the package; a cut partially through each lead-in wire would then permit breakoff and enabling of that lamp. If such lamps are to be mounted in multilamp units such as flash cubes or flash arrays, then the cutting of the loop would be the last lamp operation to take place before actual lamp insertion into the device.

For example, a preferred method of making a photoflash unit according to the invention comprises the following steps. First, in the manufacturing of the lamp, the hairpin 8, 11, 10 is shaped, and insulating sleeve 12 is inserted over the top portion of lead-wire 8. The lead-in wires and one end of sleeve 12 are then sealed into one end of a length of glass envelope tubing at the press 4, with the hairpin bight 11 extending outwardly therefrom. A quantity of primer material is dip-applied so as to provide the mass 14 bridging the free ends of the lead-in wires within the envelope tubing. The envelope tubing is then filled with a quantity of filamentary combustible material 16, such as shredded zirconium, and a combustion supporting gas, such as oxygen. The open end of the tubing is then constricted and tipped off to provide an hermetically sealed envelope. A protective lacquer coating is then applied to the exterior of the glass envelope, such as by dipping an drying. All through this process the lamp leads are interconnected by loop 11, which maintains the lamp in a disabled state for providing electrostatic protection. Just prior to assembly to the lamp mounting means of the photoflash unit (such as a base or printed circuit board), the electrical interconnection (loop 11) is cut to enable the lamp so that it can be fired.

Operation of such enabled high voltage type flashlamps is initiated when a high voltage pulse from, e.g., a piezoelectric crystal, is applied across the two lead-in wires 8 and 10. Electrical breakdown of the primer causes its deflagration which, in turn, ignites the shredded metallic combustible 16.

The advantage of this invention is that it provides significant electrostatic protection for high-voltage type flashlamps in a way that is inexpensive and which lends itself readily to automated lamp manufacturing processes. Such protection improves the safety of handling such flashlamps and also greatly reduces the loss of produce due to inadvertent ignition caused by stray electrostatic charges.

An obvious alternative method would involve attachment of foil, clips, or a wire shorting member across the lead-in wires of high-voltage flashlamps. The use of such secondary shorting means would be more expensive, less failsafe, and would introduce difficulties in automated application. A second obvious alternative would involve twisting or otherwise mechanically interlocking the external ends of the lead-in wires. This, too, would give less positive electrical connection of the lead-in wires. Also, the operation of untwisting or disconnecting the wires automatically, prior to assembly into a flash device would be formidable.

The idea believed to be new is the electrical interconnection of the exterior lead-in wires of high-voltage type flashlamps so as to render such lamps resistant toward contact with externally charged objects. This is most conveniently done by forming the lead-in wires from a single loop and retaining that loop, external to the lamp, as the electrical interconnection between the lead-in wires.

A test which illustrates the concepts disclosed herein was carried out using lamps of the design shown. The lamps were fabricated from 0.259: O.D. type 7052 glass. Lamp internal volume was 0.35 $cm^3$; pressure was 1220 cm. Hg absolute; zirconium shred weight was 14.5 mg.; and shred 16 dimensions were 4 inch length and 0.00093: × 0.0012 inch cross-section. The lead-in wires were 0.014: diameter Rodar; and the insulating sleeve 12 was type 7052 glass 0.160 inches long, having an O.D. of 0.060 inch and an I.D. of 0.030 inches. Approximately 3 mgs. of primer was used; the primer comprised 99.4% by weight zirconium powder and 0.6% by weight cellulose nitrate. In the test, the lamps were placed tip-down into brass cups of ⅜ inch I.D. and about ⅝ inches deep, mounted on a motor-driven turntable. The turntable and brass cups were electrically grounded. The lamp leads passed under a contactor having a DC potential of 6,300 volts. Each group comprised 150 lamps.

| | No. Flashed | % Flashed |
|---|---|---|
| Test (interconnected leads) | 32 | 21.3 |
| Control (individual leads) | 91 | 60.7 |

This test shows a threefold reduction in lamp flashing in this somewhat severe test when the lead-in wires were connected externally in the form of a loop, or bight.

Although the invention has been described with respect to a specific embodiment, it will be appreciated that modifications and changes may be made by those skilled in the art without departing from the true spirit and scope of the invention.

What I claim is:

1. A photoflash lamp comprising:

an hermetically sealed, light-transmitting envelope;

a quantity of filamentary combustible material located within said envelope;

a combustion-supporting gas in said envelope;

an ignition means disposed in said envelope in operative relationship with respect to said filamentary combustible material, said ignition means including a pair of lead-in wires extending into said envelope in a spaced relationship, said pair of lead-in wires comprising the two legs of a generally hairpin-shaped wire, a mass of primer material bridging said lead-in wires within said envelope, and the bight of said hairpin-shaped wire being outside of said envelope for electrically interconnecting the external portions of said pair of lead-in wires to effect a short circuit thereacross, whereby the lamp is disabled until ready for assembly or use.

2. The lamp of claim 1 further including a sleeve of insulating material extending within said envelope about one of said lead-in wires, said sleeve being sealed to said envelope at one end and open at the other end, the other of said lead-in wires terminating at or near the open end of said sleeve, and said mass of primer material being disposed to substantially cover the open end of said sleeve and bridge said lead-in wires.

3. A method of making a photoflash unit including a flashlamp and lamp mounting means, said method comprising:

obtaining a flashlamp having an envelope and a pair of lead-in wires comprising the two legs of a generally hairpin-shaped wire electrically interconnected outside of said envelope by the bight of said hairpin-shaped wire to effect a short circuit across said lead-in wires;

cutting the electrical interconnection of said lead-in wires to enable said lamp; and assembling said flashlamp to said mounting means.

4. The method of claim 3 wherein said flashlamp is obtained by sealing said lead-in wires into one end of a length of glass tubing with said hairpin bight extending outwardly therefrom, bridging the free ends of said lead-in wires within said glass tubing with primer material, filling said glass tubing with a quantity of filamentary combustible material and a combustion-supporting gas, tipping off the tubing to provide an hermetically sealed envelope, and applying a protective coating on the exterior of said envelope.

* * * * *